(12) United States Patent
Lv et al.

(10) Patent No.: US 12,462,396 B2
(45) Date of Patent: Nov. 4, 2025

(54) GENERATION METHOD AND DEVICE FOR BLOOD FLOW SPECTRUM ENVELOPE, AND READABLE STORAGE MEDIUIM

(71) Applicants: THE THIRD MEDICAL CENTER CHINESE PLA GENERAL HOSPITAL, Beijing (CN); Healson Technology Co., Ltd., Sichuan (CN)

(72) Inventors: Faqin Lv, Beijing (CN); Xiaoliang Li, Beijing (CN); Youquan Xiong, Sichuan (CN)

(73) Assignees: The Third Medical Center Chinese PLA General Hospital, Beijing (CN); Healson Technology Co., Ltd., Sichuan (CN)

( * ) Notice: Subject to any disclaimer, the term of this patent is extended or adjusted under 35 U.S.C. 154(b) by 333 days.

(21) Appl. No.: 18/325,428

(22) Filed: May 30, 2023

(65) Prior Publication Data

US 2024/0404071 A1 Dec. 5, 2024

(30) Foreign Application Priority Data

Mar. 28, 2022 (CN) .......................... 202210311962.3

(51) Int. Cl.
| | |
|---|---|
| *G06T 7/194* | (2017.01) |
| *A61B 8/06* | (2006.01) |
| *G06T 7/00* | (2017.01) |
| *G06T 7/136* | (2017.01) |

(52) U.S. Cl.
CPC ............ *G06T 7/136* (2017.01); *G06T 7/0012* (2013.01); *G06T 2207/10132* (2013.01)

(58) Field of Classification Search
USPC ........ 128/915–916, 922–925; 345/440–441, 345/418–682; 382/100–180; 600/481–528, 921
See application file for complete search history.

(56) References Cited

U.S. PATENT DOCUMENTS 11,850,100 B2 * 12/2023 Chan ..................... G16H 50/20
2024/0005545 A1 * 1/2024 Wang .................... G06T 3/4007

OTHER PUBLICATIONS

Zhang, Wen-wei; Image Segmentation Method, Device, Computer Device and Storage Medium; 2021 (Year: 2021).*
Palanisamy Krishnamoorthy; Ultrasound Data Processor; 2022 (Year: 2022).*

(Continued)

*Primary Examiner* — Marcellus J Augustin
(74) *Attorney, Agent, or Firm* — NKL Law; Allen Xue

(57) ABSTRACT

A generation method and device for a blood flow spectrum envelope includes: importing an image, then finding a connected domain; obtaining a contour map through the connected domain; marking coordinates of contour pixel points on the contour map; and connecting all the coordinates to form a blood flow spectrum envelope. A program stored in the storage medium or a processor of an ultrasound device has the steps of the generation method for the blood flow spectrum envelope. The blood flow spectrum envelope is automatically found; and when the image is continuously collected by ultrasound, the envelope is generated in real time according to the image collected by ultrasound in the disclosure to analyze a blood flow.

10 Claims, 8 Drawing Sheets

(56) References Cited

OTHER PUBLICATIONS

Xie, Can-hui; Method for Generating Spectral Envelope Line, Device, Ultrasonic Device, and Storage Medium; 2020 (Year: 2020).*

Viggen, K; For Automatic Analysis of Doppler Spectrum Method and System; 2018 (Year: 2018).*

Abe, Yasuhiko; Ultrasonic Wave Diagnosis Device and Image Processing Method; 2015 (Year: 2015).*

* cited by examiner

GENERATION METHOD AND DEVICE FOR BLOOD FLOW SPECTRUM ENVELOPE, AND READABLE STORAGE MEDIUIM

FIELD

The present disclosure relates to the technical field of computers, in particular to a generation method and device for a blood flow spectrum envelope, and a readable storage medium.

BACKGROUND

A blood flow spectrum image can be conveniently analyzed by drawing a blood flow spectrum envelope. In order to meet a drawing requirement, the current most reliable way is manual marking, which, however, is not conducive to automation.

Therefore, it is necessary to further research how to use a computer image recognition technology to further draw the blood flow spectrum envelope.

When the computer image recognition technology is used to further draw the blood flow spectrum envelope, there are mainly the following technical difficulties:

A blood flow spectrum image is acquired by a color Doppler ultrasound device according to an ultrasound principle, and color Doppler ultrasound image is sensitive to gain. When a color Doppler ultrasound gain is greater, and the acquired image is relatively complex in background and relatively high in noise, so that it is very difficult to separate color blocks where blood flow spectra are located from the background. When the color Doppler ultrasound gain is smaller, the background is relatively simple, and the noise is low. However, at the same time, the brightness of the color blocks where the blood flow spectra are located is also slightly low, and even, a part of the color blocks where the blood flow spectra are located are fractured to result in incomplete display, which also makes the image situation complex.

Therefore, it is difficult to draw the blood flow spectrum envelope by using the computer image recognition technology. It is necessary to solve such a technical problem.

SUMMARY

In order to solve the above-mentioned technical problems, the present disclosure provides a generation method and device for a blood flow spectrum envelope, and a readable storage medium.

The generation method for the blood flow spectrum envelope provided by the present disclosure is implemented by a computer device with a processor according to the following steps:

S1: An image is imported.

The image is a blood flow spectrum image acquired from a blood vessel of an organism by an ultrasound device. A starting position of a blood flow spectrum waveform serves as a first lateral edge, a second lateral edge is opposite to the first lateral edge, and a spacing between the first lateral edge and the second lateral edge serves as a width of the image, a direction directed by a peak of the blood flow spectrum waveform serves as an upside of the image, and a direction opposite to the upside serves as a downside. A spacing between the upside and the downside serves as a height of the image.

S2: Block domains are found.

(i) the domain is a maximum connected domain between the first lateral edge and the second lateral edge, and further include: (ii) other domains located between the maximum connected domain and each of the first lateral edge and the second lateral edge are further included when a width of the maximum connected domain does not fully occupy the width of the image, wherein gray values of the other domains and the maximum connected domain are within the same interval.

S3: A contour of each block domain is drawn by using contour pixel points to obtain a contour map.

S4: The contour pixel points are found starting from a first side of the contour map, coordinates of the found contour pixel points are recorded, and all the coordinates are connected to form the blood flow spectrum envelope. Moreover, (i) The coordinates of the found contour pixel points among the respective block domains are not connected to each other.

(ii) The found contour pixel points are first contour pixel points found from top to bottom in respective columns.

(iii) Coordinates of a contour pixel points found in the current column except a first column of each block domain are located in eight neighborhoods of coordinates of a contour pixel point found in a previous column; if not, coordinates are supplemented until the coordinates of the contour pixel point found in the current column are located in the eight neighborhoods of the coordinates of the contour pixel points found in the previous column.

The above-mentioned generation method for the blood flow spectrum envelope is further described as: after the image is imported, the method also includes a step that threshold processing is performed on the image, which specifically includes:

S11: performing Gaussian smoothing on the image; and

S12: acquiring a binary image by using an OTSU threshold segmentation algorithm.

The above-mentioned generation method for the blood flow spectrum envelope is further described as follows: the step that the block domains are found includes the following steps:

S21: acquiring all block domains in the binary image;

S22: finding a maximum connected domain between a first lateral edge and a second lateral edge by adopting a non-maximum suppression algorithm; and S23: when a width of the maximum connected domain does not fully occupy a width of the image, finding other domains between the maximum connected domain and each of the first lateral edge and the second lateral edge by adopting the non-maximum suppression algorithm again.

The above-mentioned generation method for the blood flow spectrum envelope is further described as follows: the number of the other domains between the maximum connected domain and each of the first lateral edge and the second lateral edge is not limited.

A width of any other domain is not smaller than $1/20$ of the width of the image, and a height of any other domain is not smaller than $1/4$ of the height of the image. Otherwise, a domain is not recognized as the other domains.

When the other domains still do not fully occupy a width between the maximum connected domain and each of the first lateral edge and the second lateral edge, another domain is further found on a part not occupied on a width among the maximum connected domain, other domains, the first lateral edge and the second lateral edge by using the non-maximum suppression algorithm until no other domains exist in the part not occupied on the width.

The above-mentioned generation method for the blood flow spectrum envelope is further described as following: the step that the contour of each block domain is drawn to obtain a contour map includes the specific steps:

S31: cropping the image by taking the block domains as mask files to obtain cropped block domain images; and S32: for the block domain images, the contour of each block domain is drawn by using a Sobel operator to obtain a contour map, wherein the contour map is formed by contour pixel points.

The above-mentioned generation method for the blood flow spectrum envelope is further described as follows: the step that the contour pixel points are found from the first side of the contour map, and the coordinates of the found contour pixel points are recorded includes the following specific steps:

S41: newly creating a blank drawing board of which all pixel points have gray values being 0;

S42: marking the coordinates on the blank drawing board to form mark points on the blank drawing board; and S43: connecting all the mark points to form a blood flow spectrum envelope.

The above-mentioned generation method for the blood flow spectrum envelope is further described as follows: the step that the coordinates are supplemented specifically includes:

comparing position indexes of the current coordinates with position indexes of the previous coordinates with the coordinates of the contour pixel points found in the current column as current coordinates and the coordinates of the contour pixel points found in the previous column as previous coordinates, wherein the position indexes are index numbers of the coordinates in the pixel rows on the blank drawing board, and the index numbers are gradually increased from upside to downside;

supplementing coordinates one by one at the downsides of the current coordinates until the supplemented coordinates are located in the eight neighborhoods of the previous coordinates when the position indexes of the current coordinates are smaller than the position indexes of the previous coordinates; and supplementing coordinates one by one at the downside of the previous coordinates until the supplemented coordinates are located in the eight neighborhoods of the current coordinates when the position indexes of the current coordinates are greater than the position indexes of the previous coordinates.

The above-mentioned generation method for the blood flow spectrum envelope is further described as follows: the image includes one of:

a PGM image, a DICOM image and an NIFTI image;

any one of a JPEG image, a BMP image, a PNG image and a TIFF image obtained after any one of the PGM image, the DICOM image and the NIFTI image is converted; and a static image with any frame in a video file format.

The present disclosure provides a generation device for a blood flow spectrum envelope, including a processor, a communication interface and a memory, wherein the memory stores a computer program, and the computer program, when executed by the processor, enables the processor to perform the steps of the above-mentioned generation method for the blood flow spectrum envelope.

The present disclosure further provides a storage medium storing a computer program, and the computer program is executed by hardware to implement the generation device for the blood flow spectrum envelope.

The present disclosure further provides an ultrasound device, including a display, a processor, a communication interface, a memory and an ultrasound transducer probe. The processor is in data connection with the ultrasound transducer probe by the communication interface, and issues an instruction to the ultrasound transducer probe, and the ultrasound transducer probe feeds an ultrasound signal back to the processor. The processor displays the ultrasound signal on the display to form a blood flow spectrum image, wherein the processor performs the steps of the above-mentioned generation method for the blood flow spectrum envelope.

Beneficial technical effects of the present disclosure:

In the present disclosure, the blood flow spectrum envelope is automatically found. When the image is continuously collected by ultrasound, the envelope is generated in real time according to the image collected by ultrasound in the present disclosure to analyze a blood flow.

In the present disclosure, the algorithm is high in speed.

The method and device of the present is applicable when the gain is greater during ultrasound collection, and the background of the output image is complex. Similarly, the method and device of the present disclosure is also applicable when the gain is smaller during ultrasound collection, the brightness of the color blocks where the blood flow spectra are located is slightly low, and parts of the blood flow spectra are incompletely displayed.

According to the present disclosure, the envelope can be found from a blood flow spectrum image provided and collected in real time by the ultrasound device, and an envelope can also be found from a blood flow spectrum image stored in a local database, which is not limited by scenarios and conditions.

BRIEF DESCRIPTION OF THE DRAWINGS

In order to describe the technical solutions mentioned in the embodiments of the present application more clearly, the accompanying drawings required for describing the embodiments will be briefly introduced below. However, the accompanying drawings in the following description show only some embodiments of the present application, and those of ordinary skill in the art may easily derive other accompanying drawings from these accompanying drawings without creative efforts.

Figure 1:
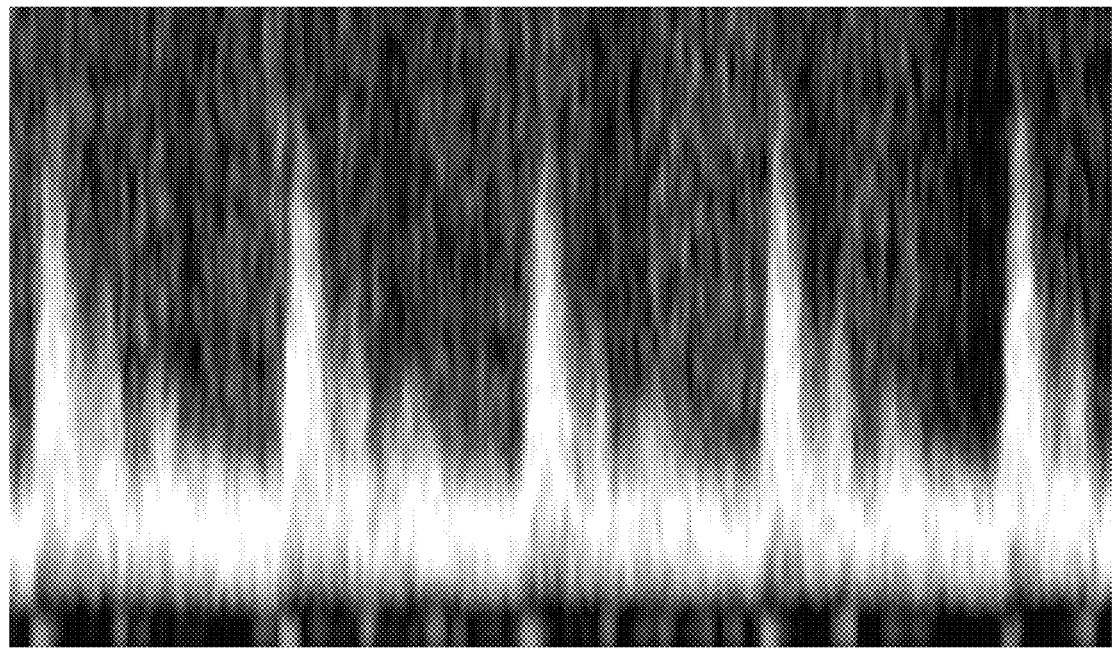
FIG. 1 is a blood flow spectrum image obtained by color Doppler ultrasound and shows an image acquired when a color Doppler ultrasound gain is greater, wherein a high-brightness part is a blood flow spectrum waveform and noise.

In which:

image 1; contour map 2; blank drawing board 3; envelope 4; first lateral edge 11; second lateral edge 12; upside 13; downside 14; maximum connected domain 15; other domain 16; noise 17; pixel column direction X; pixel row direction Y; second mark point d2; third mark point d3; fourth mark point d4; fifth mark point d5; sixth mark point d6; and seventh mark point d7.

DETAILED DESCRIPTION OF THE EMBODIMENTS

The present disclosure is preferably implemented in the form of software codes, and steps in the present disclosure are compiled as software codes to be installed in a computer with a calculation function, for example, are installed in a personal PC, a smartphone or a tablet computer in the form of the software codes.

Those of ordinary skill in the art can further realize that algorithm steps in all examples described in combination with the embodiments disclosed herein can be implemented by electronic hardware or a combination of computer software and the electronic hardware. Whether these functions are implemented by hardware or software depends upon specific applications and design constraints of the technical solutions. Professional technicians can use different methods to achieve the described functions in each specific application, which, however, should be considered as falling within the scope of the present disclosure.

The present disclosure is implemented by installing a corresponding computer program in a computer with relevant hardware. The computer program may be stored in a computer-readable storage medium, and when the computer program is executed by a processor, various required steps can be implemented. The computer program includes a computer program code, and the computer program code can be in a source code form, an object code form, an executable file or some intermediate forms, etc. The computer-readable storage medium may include any entity or device, a recording medium, a USB flash disk, a mobile hard disk, a diskette, a compact disc, a computer memory, an ROM (Read-Only Memory), an RAM (Random Access Memory), an electric carrier signal, a telecommunication signal, a software distribution medium, or the like capable of carrying the computer program code.

Main hardware of the computer in the present disclosure mainly includes the following main parts: a central processing unit, an internal memory, a chip set, an I/O bus, I/O device, a power supply, a case and relevant software.

An image 1 in the present disclosure is a blood flow spectrum image acquired from a blood vessel of an organism by an ultrasound device, wherein the organism includes a body of the human being or any other animal and mainly refers to a human body herein.

Figure 2:
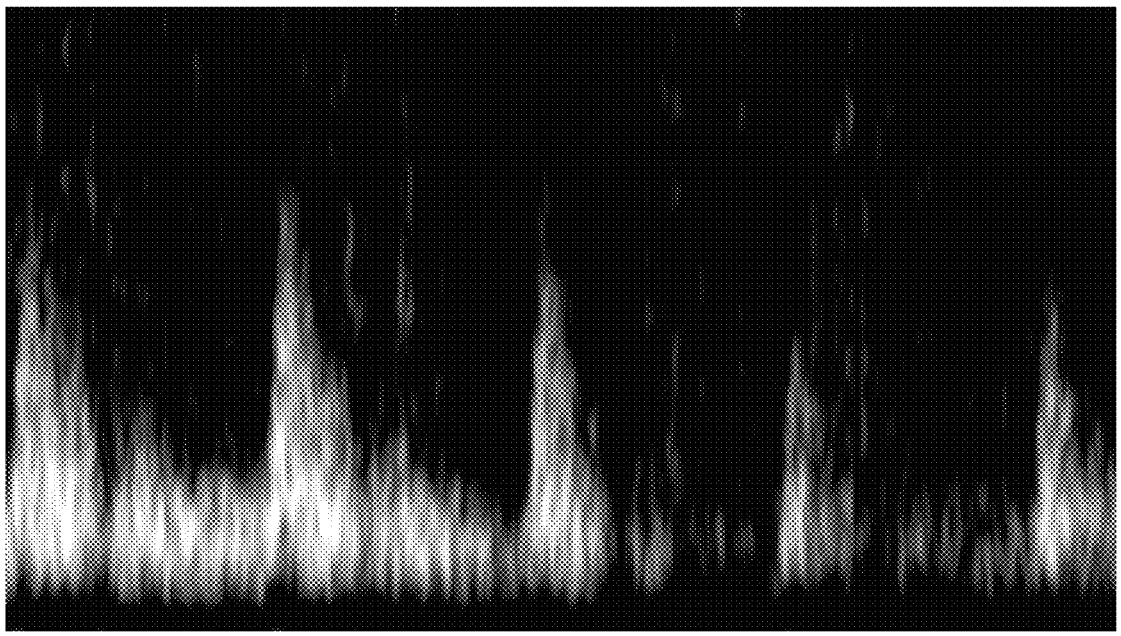
FIG. 2 is a blood flow spectrum image obtained by color Doppler ultrasound and shows an image acquired when a color Doppler ultrasound gain is smaller, wherein a high-brightness part is a blood flow spectrum waveform and noise, and there are fractures on the high-brightness part.

In the blood flow spectrum image, a blood flow periodically passes through the blood vessel with the pumping of the heart to form peaks and valleys of the blood flow in the blood vessel, which forms a periodic waveform image when being reflected on the blood flow spectrum image. Referring to FIG. 1 and FIG. 2, in an example of the blood flow spectrum image, a higher-brightness part is a blood flow spectrum waveform (smaller in gray value) and point-like noise, and a background part is black (greater in gray value).

Of course, in fact, there is often a negative wave part (similar to a reflection of a positive wave) in the blood flow spectrum image obtained by the ultrasound device. At the early stage, the image needs to be cropped to remove the negative wave part. The acquired image can be cropped at the early stage to retain only a positive wave part.

The image in the present disclosure may be a PGM image; or a DICOM image; or an NIFTI image. Or the image is any one of a JPEG image, a BMP image, a PNG image and a TIFF image obtained after the PGM image, the DICOM image and the NIFTI image are converted or is any one of a JPEG image, a BMP image, a PNG image and a TIFF image obtained from other channels. For example, the image is a static image formed by each frame in a video file format (such as MP4, AVI and RMVB) or is a JPEG image, a BMP image, a PNG image and a TIFF image converted from the static image. In a word, the image can be recognized by a computer and is preferably in a mainstream image format.

Figure 5:
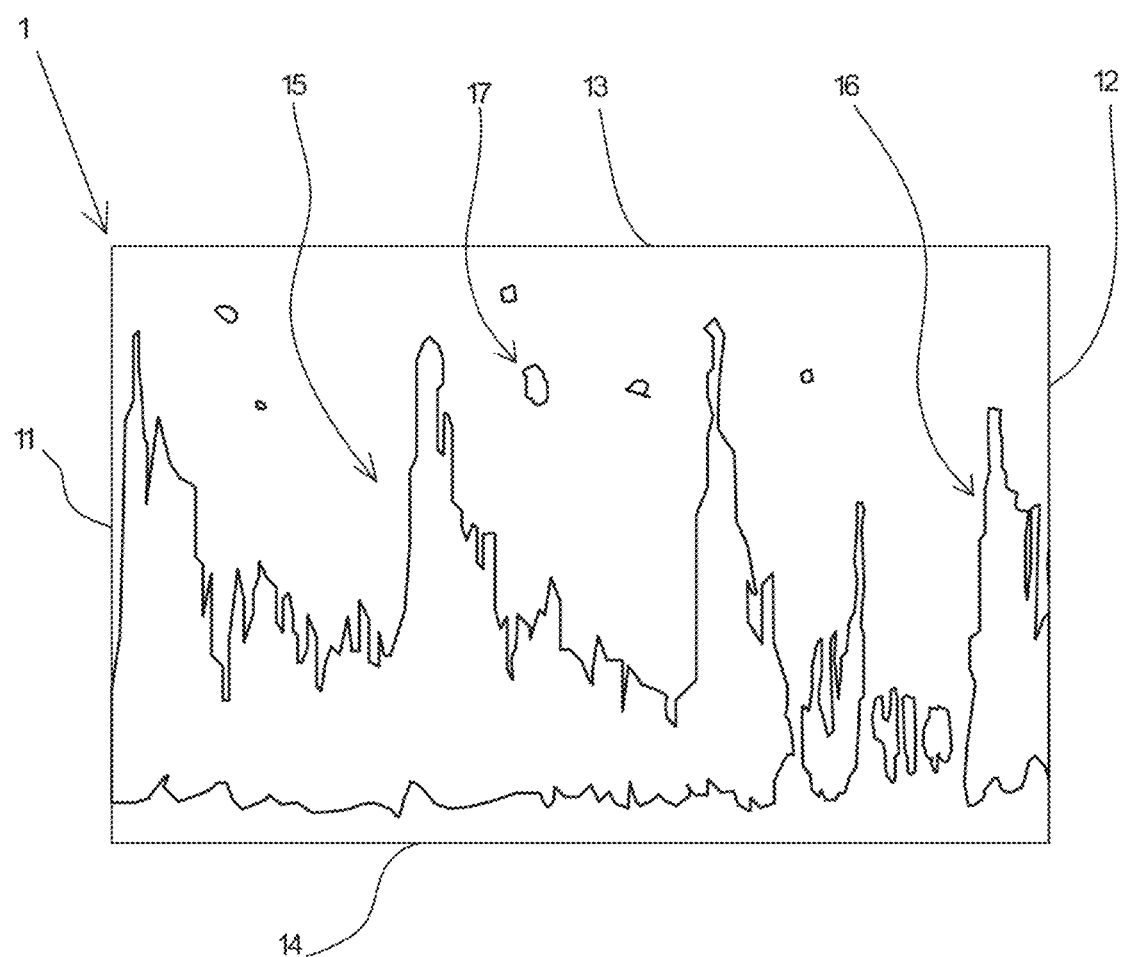
FIG. 5 is a schematic diagram of a block domain of an image.

Referring to FIG. 5, in the present disclosure, the image is provided with a first lateral edge, a second lateral edge, an upside and a downside.

Referring to FIG. 1, FIG. 2 and FIG. 5, as a signal is collected by ultrasound, a blood flow spectrum image is continuously generated, and blood flow spectra start to be generated on one side of a display screen and advance to the other side with the development of a waveform. Therefore, in the present disclosure, a starting position where a blood flow spectrum waveform starts to be generated serves as a first lateral edge 11, and a second lateral edge 12 is opposite to the first lateral edge. A spacing between the first lateral edge and the second lateral edge serves as a width of the image. A direction directed by a peak of the blood flow spectrum waveform serves as an upside of the image (that is, a direction directed by a peak of a positive wave serves as the upside of the image), a direction opposite to the upside serves as a downside, and a spacing between the upside and the downside serves as a height of the image.

After the first lateral edge 11, the second lateral edge 12, the upside 13 and the downside 14 of the image 1 are determined, first lateral edges, second lateral edges, upsides and downsides of block domains, contour maps and block domain images all correspond to the first lateral edge, the second lateral edge, the upside and the downside of the image in the same direction.

It should be noted that the upside and the downside described herein are only for the purpose of facilitating description in the specification and understanding of the present disclosure, rather than limiting implementation manners of the present disclosure.

Figure 3:
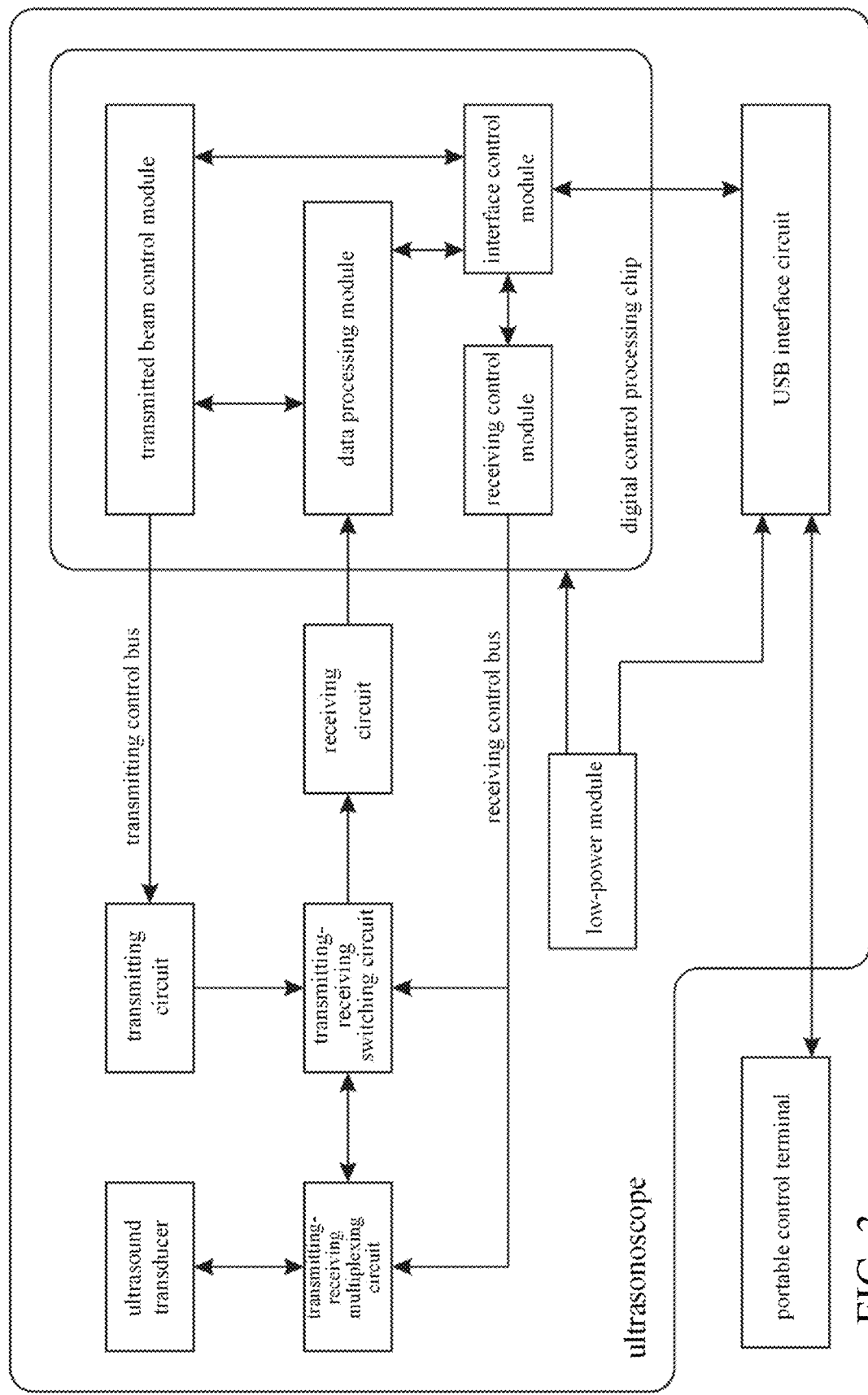
FIG. 3 is a structural diagram of an ultrasound device.

In an example, referring to FIG. 3, the image in the present disclosure is acquired from a blood vessel of an organism by an ultrasound device, and it is necessary to collect and process ultrasound image information firstly. The ultrasound image information can be collected with reference to the following ultrasonoscope device in Chinese patent CN209751086U which can collect and process ultrasound image information.

The ultrasonoscope device in the present embodiment includes an ultrasound transducer for emitting a scanning beam, a digital control processing chip for controlling the ultrasound transducer to emit the scanning beam and collect an echo signal, a portable control terminal for emitting a control instruction to the digital control processing chip and viewing a scanned image, as well as a transmitting-receiving multiplexing circuit, a transmitting-receiving switching circuit, a transmitting circuit, a receiving circuit, a USB interface circuit, a low-power module and an ultrasonoscope housing.

The transmitting-receiving switching circuit, the transmitting-receiving multiplexing circuit and the ultrasound transducer are sequentially connected in series. The transmitting circuit and the receiving circuit are respectively connected to the transmitting-receiving switching circuit. The ultrasound transducer, the digital control processing chip, the transmitting-receiving multiplexing circuit, the transmitting-receiving switching circuit, the transmitting circuit, the receiving circuit and the USB interface circuit are all packaged in the ultrasonoscope housing. The ultrasound transducer is located on a front end of the ultrasonoscope housing. A front end surface of the ultrasonoscope housing is a coupling plane, and the USB interface circuit is located on a rear end of the ultrasonoscope housing.

The low-power module is internally provided with:

1. a digital power supply, which is configured to supply adaptive electrical energy to the digital control processing chip, the transmitting-receiving switching circuit, the transmitting circuit and the transmitting-receiving multiplexing circuit, is internally provided with a linear voltage regulator for protecting the voltage stability thereof, and is connected to the digital control processing chip, the transmitting-receiving switching circuit, the transmitting circuit and the transmitting-receiving multiplexing circuit respectively;

2. an analog power supply, which is configured to supply adaptive electrical energy to the transmitting-receiving multiplexing circuit and the receiving circuit, is internally provided with a linear voltage regulator for protecting the voltage stability thereof, and is connected to the transmitting-receiving multiplexing circuit and the receiving circuit respectively;

3. an adjustable high-voltage DC converter, which is configured to supply an adaptive high voltage to the transmitting circuit, and is connected to the transmitting circuit; and 4. an overcurrent protector, which is configured to limit the intensity of current supplied to the digital power supply, the analog power supply and the adjustable high-voltage DC converter, wherein the digital power supply, the analog power supply and the adjustable high-voltage DC converter are respectively connected to the USB interface circuit by the overcurrent protector.

The image acquired by the above-mentioned ultrasound device is a blood flow spectrum image.

It is possible that the blood flow spectrum image is stored and imported to another computer installed with software for an image processing method in the present disclosure after being acquired by the ultrasound device, and an envelope is obtained by processing the image via the software running according to the method in the present disclosure. It is also possible that the processing method in the present disclosure is processed into installable software to be built in the above-mentioned ultrasound device. The ultrasound device processes the blood flow spectrum image while acquiring the blood flow spectrum image, thereby directly obtaining the envelope. Therefore, the method in the present disclosure is not limited to be installed on an ultrasound acquisition device or a personnel computer, a smartphone or other computing devices.

In an example, a generation device for a blood flow spectrum envelope may be provided, which is provided with a processor, a communication interface and a memory, wherein the memory stores a computer program, and the computer program, when executed by the processor, enables the processor to perform the steps of the generation method for the blood flow spectrum envelope.

An example may provide a storage medium storing a computer program therein. The computer program described herein is implemented by hardware to implement the steps of the generation method for the blood flow spectrum envelope.

An example may provide an ultrasound device provided with a basic display, a processor, a communication interface, a memory and an ultrasound transducer probe. The processor is in data connection with the ultrasound transducer probe by the communication interface, and issues an instruction to the ultrasound transducer probe. The ultrasound transducer probe feeds an ultrasound signal back to the processor. The processor displays the ultrasound signal on the display to form a blood flow spectrum image. Particularly, the processor described herein may perform the generation method for the blood flow spectrum envelope in the present disclosure.

Figure 4:
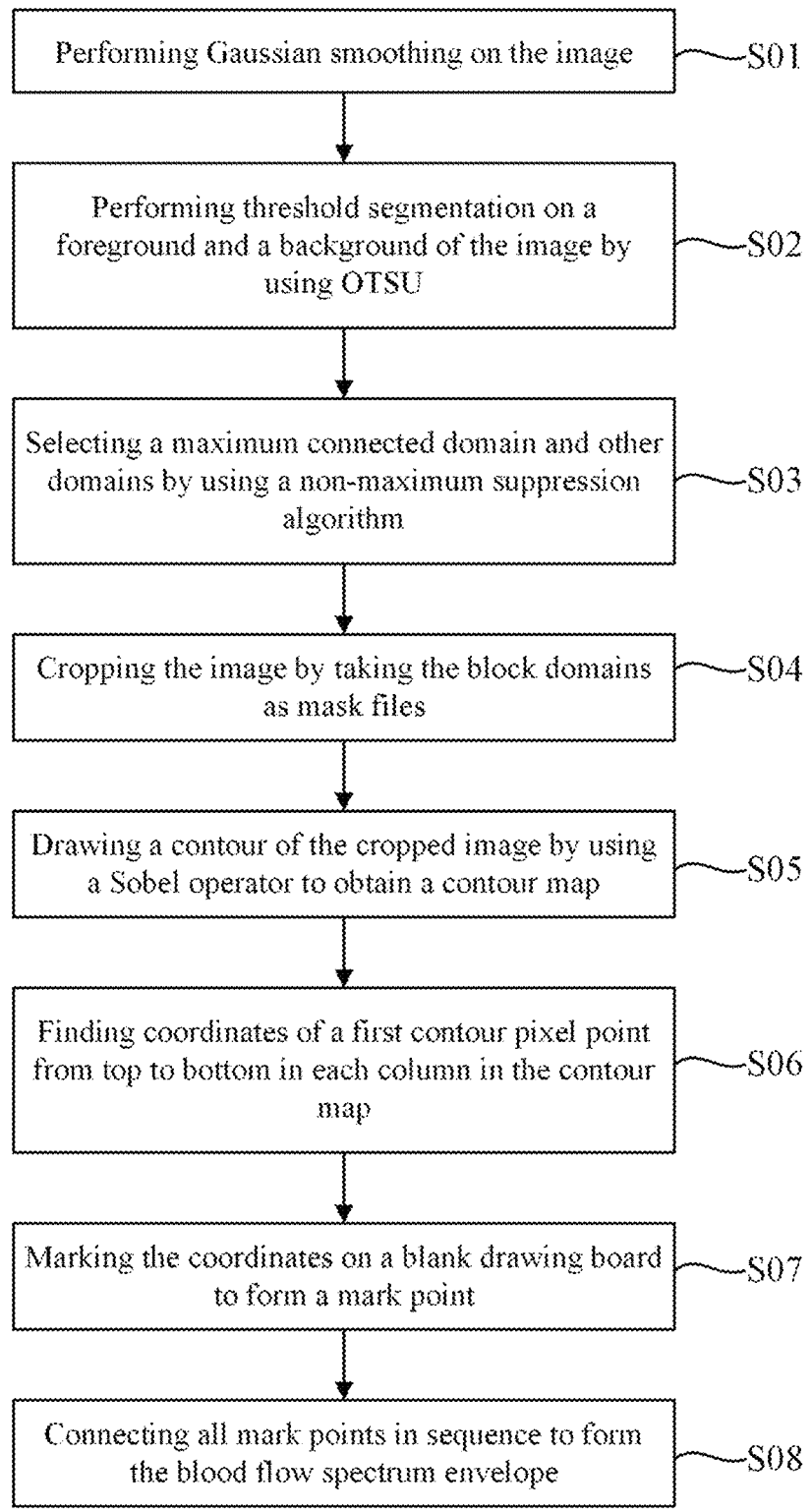
FIG. 4 shows processing steps of a generation method for a blood flow spectrum envelope.

Referring to FIG. 4, in an example, the generation method for the blood flow spectrum envelope is implemented according to the following processing steps.

Firstly, an image is imported. Then, a binary image is acquired by the following two steps.

S01: Gaussian smoothing is performed on the image to remove details and noises in the image.

S02: OTSU is used to automatically calculate a threshold and segment a foreground and a background of the image, wherein the foreground is the blood flow spectrum image and shows a high-brightness continuous region in the image, and the background is a black region.

When the threshold is automatically calculated by using the OTSU, firstly, a mean value of gray values is obtained by calculating a gray histogram of this image, and is set as M. Then, a gray value t is optionally selected, and thus, this histogram can be divided into two parts including a foreground A and a background B. The foreground is set as A, and the background is set as B, wherein a mean value of the foreground is set as MA, and a mean value of the background is set as MB. A proportion of the number of pixels in the foreground to a total number of pixels is denoted as PA, and a proportion of the number of pixels in the background to the total number of the pixels is denoted as PB. An inter-class variance given by the OTSU is defined as:

$$ICV=PA \times (MA-M)^2 + PB \times (MB-M)^2$$

An optimal threshold is set as t, and t is a value maximizing an ICV result.

On the image, various values of t are substituted to calculate the ICV and obtain an ICV curve, and the foreground and the background may be segmented by taking the optimal threshold t of the ICV.

After the foreground and the background are segmented, binarization may be performed on the image to obtain the binary image.

Next, block domains are found.

Referring to FIG. 5, the block domains are defined as follows: the block domain is a maximum connected domain between the first lateral edge 11 and the second lateral edge 12, and of course, this maximum connected domain is defined as the foreground, rather than the background. If a width of the maximum connected domain does not fully occupy the width of the image, other domains 16 having gray values within the same interval as a gray value of the maximum connected domain are also be included. After threshold segmentation in the above-mentioned step is completed, the gray values of the foreground of the image are basically consistent, and therefore, the gray values are within the same interval. There are no great differences in the gray values of the other domains 16 and the maximum connected domain 15, but differences lie in the gray values of the background.

The step that the block domains are found includes the following step:

all block domains including block domains where noise is formed in the binary image are acquired, and all the block domains in the image are selected.

S03: Blood flow spectra are selected from the block domains including the blood flow spectra and noise by using a non-maximum suppression algorithm, and a maximum connected domain between a first lateral edge and a second lateral edge is found. Threshold segmentation is performed at the early stage, and therefore, there are only the blood flow spectra and the noise in the image. However, referring to FIG. 1, blood flow spectra output from the image acquired by a color Doppler ultrasound device in a higher gain modulation state are an entire block and are continuously connected from the first lateral edge to the second lateral edge of the image, which is certainly the maximum connected domain in the image. A connected domain of the noise 17 is isolated like points and is substantially not the maximum connected domain, and therefore, finding the maximum connected domain is to find the blood flow spectrum image.

In another situation, blood flow spectra output from the image acquired by the color Doppler ultrasound device in a lower gain modulation state are not an entire block and have fractures. Referring to FIG. 2, of course, the maximum connected domain is still the blood flow spectra (it cannot be the noise) even under such a situation, but the maximum connected domain does not fully occupy the width of the whole image. Under such a situation, the other domains between the maximum connected domain and each of the first lateral edge and the second lateral edge are found by adopting the non-maximum suppression algorithm again.

The number of the other domains between the maximum connected domain 15 and each of the first lateral edge 11 and the second lateral edge 12 is not limited and may be one or more. When the other domains 16 still do not fully occupy a width between the maximum connected domain and each of the first lateral edge and the second lateral edge, another domain is further found on a part not occupied on a width among the maximum connected domain, the other domains, the first lateral edge and the second lateral edge by using the non-maximum suppression algorithm until no other domains of which gray values are within the same interval as the gray value of the maximum connected domain exist in the part not occupied on the width. The gray values described herein are within the same interval and are determined by the threshold segmentation in the previous step. Due to the threshold segmentation, the maximum connected domain is basically the same as or slightly different from the other domains in gray value.

Another method is to directly find a plurality of other domains between the maximum connected domain and each of the first lateral edge and the second lateral edge when the maximum connected domain does not fully occupy the width of the entire image, rather than iteration like the previous method.

Conditions for controlling the other domains 16 are that an area cannot be too small, for example, a width of any other domain is not allowed to be smaller than 1/20 of the width of the image, and a height of any other domain is not allowed to be smaller than 1/4 of the height of the image.

Noise is prevented from being recognized as the other domains. Of course, such a situation may also cause parts of the blood flow spectra with smaller areas to be regarded as noise, which, however, does not affect the final analysis and utilization for the envelope because the blood flow spectrum image is continuously generated, and part of missing data cannot affect a result of entire data and can be replaced or corrected by valid data to lead to that the envelope is allowed to be discontinuous and incomplete, and the block domains are also allowed to be discontinuous and incomplete.

Then, a contour of each block domain is drawn by using contour pixel points to obtain a contour map. In a digital image, pixels are basic units for forming the image. An edge contour of each block domain is formed by a plurality of pixel points. In the present disclosure, the pixel points of the edge contour of each block domain are known as contour pixel points.

The step that the contour of each block domain is drawn by using the contour pixel points includes the following steps.

S04: The image is cropped by taking the block domains obtained in S03 as mask files to obtain a cropped block domain image.

Figure 6:
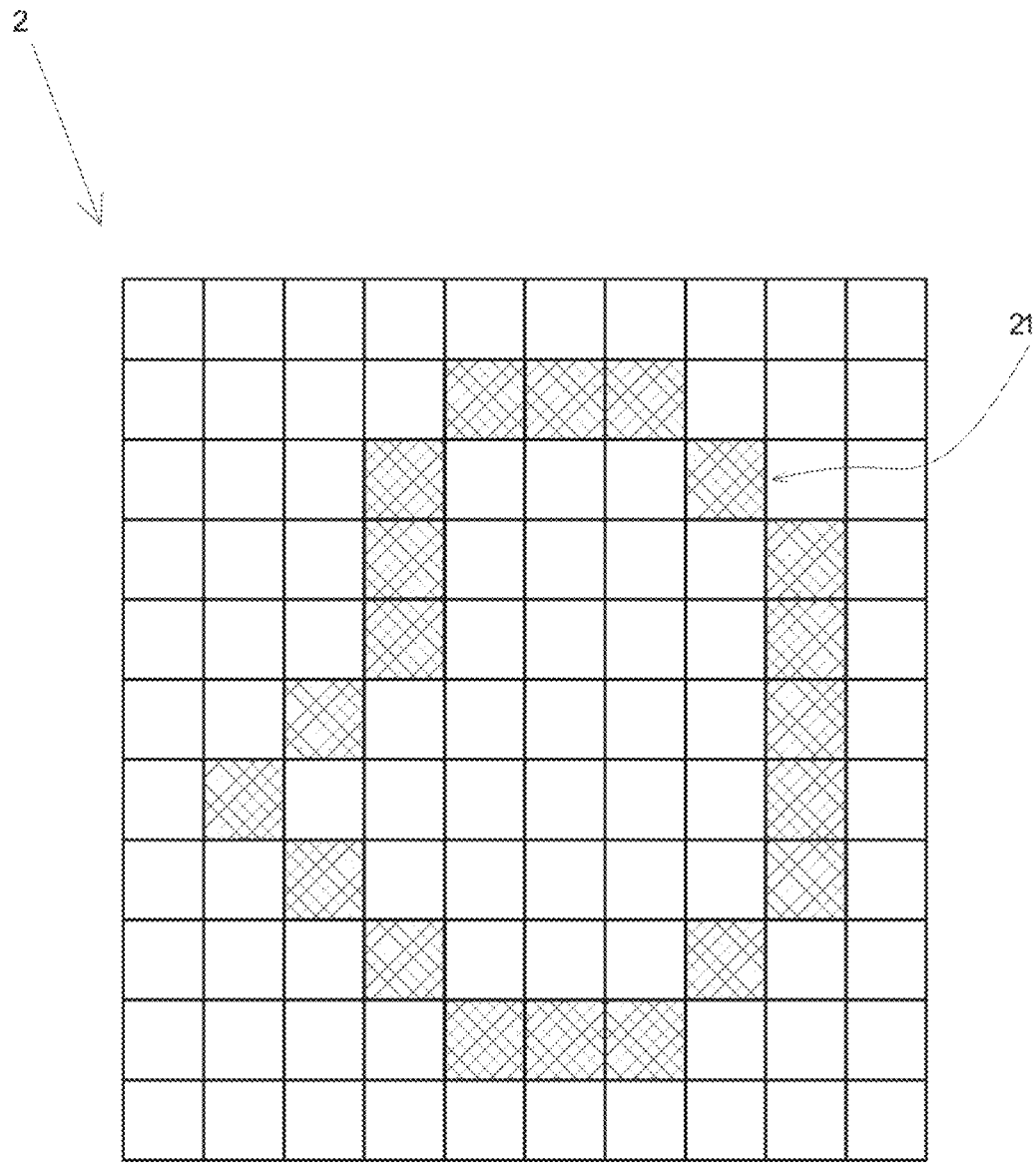
FIG. 6 is a contour map formed by contour pixel points.

S05: For the block domain image, a contour of the block domain is drawn by using a Sobel operator to obtain a contour map 2, referring to FIG. 6, wherein the contour map 2 is formed by contour pixel points 21.

Next, coordinates are obtained from the contour map 2, which includes the following specific step:

a blank drawing board 3 of which all pixel points have gray values being 0 are newly created.

S06: the contour pixel points are found starting from a first side of the contour map. Moreover, the contour pixel points are required to be first contour pixel points found from top to bottom in the respective columns.

The formed contour map 2 at least includes an upper edge contour and a lower edge contour, excluding that there is only one contour pixel point 21 on edges of left and right sides of the contour map under an extreme condition. There are at least two contour pixel points 21 in each column. However, the envelope is a trend of a peak and a valley of a blood flow spectrum, which is equivalent to that an upper edge curve of the contour map is only selected. The desired requirement is that the first contour pixel points are found from top to bottom.

Figure 7:
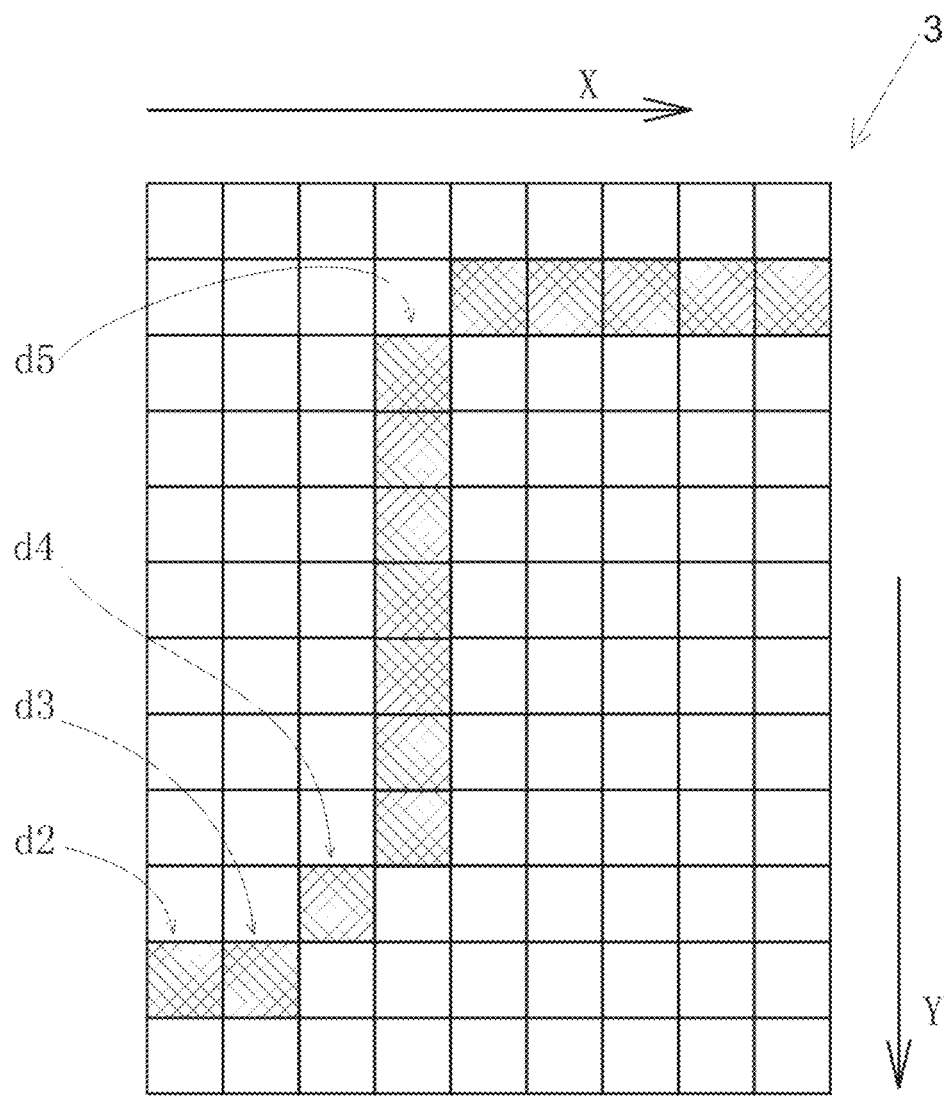
FIG. 7 is a schematic diagram of mark points formed on a blank drawing board and shows a first situation that coordinates are supplemented.

S07: Coordinates of the found contour pixel points are recorded by recording position indexes. Referring to FIG. 7, the position indexes are index numbers of pixel rows and pixel columns where the pixel points are located, which include a pixel column direction X and a pixel row direction Y For example, a first column of pixels is recorded as (X01), a 100th column of pixels is recorded as (X100). Column index numbers are increased column by column from left to right (from a first side to a second side) of the image, and row index numbers are increased row by row from upside to downside of the image, for example, a first row of pixels at the upside is recorded as (Y01), and a 100th row of pixels from upside to downside is recorded as (Y100). Position indexes of the current coordinates are compared with position indexes of the previous coordinates with the coordinates of the contour pixel points found in the current column as current coordinates and the coordinates of the contour pixel points found in the previous column as previous coordinates. Therefore, it can be known which coordinates are large in index number and which coordinates are small in index number; and the index number closer to the upside of the image is small, and the index number closer to the downside is large.

The coordinates of the found contour pixel points are recorded. Referring to FIG. 7, for example, a second contour pixel point is found from an eleventh row of pixels from top to bottom in a first column of a first block domain, and has coordinates recorded as (X01; Y11) that are then marked on a blank drawing board 3 to form a second mark point d2 which is located in the eleventh row from top to bottom in the first column on the blank drawing board. A third contour pixel point is further found from the next column, and has coordinates (X02; Y11) that are marked on the blank drawing board 3 to form a third mark point d3. Then, a fourth contour pixel point is further found from the next column and has coordinates (X03; Y10) that marked on the blank drawing board 3 to form a fourth mark point d4, etc.

All of the found contour pixel points correspond to the blank drawing board to form a series of mark points.

S08: the mark points are connected in sequence to form a blood flow spectrum envelope 4, and the blood flow spectrum envelope is displayed on a display screen.

During actual operation, there are some individual phenomena:

1. There are a plurality of block domains except the maximum connected domain in the found block domains.

For such a situation, it is required to consider problems at a gap between the block domains and problems about starting and ending of each block domain.

For the problems at the gap, a solution method in the present example is that the coordinates of the contour pixel points found among all the block domains are not connected to each other. That is, the envelope is allowed to be fractured at the gap between the block domains with reference to the description in the above-mentioned example that the final analysis and utilization for the envelope are not affected because the blood flow spectrum image is continuously generated, and part of missing data cannot affect a result of entire data and can be replaced or corrected by valid data to lead to that the envelope is allowed to be discontinuous and incomplete.

For the problem about starting and ending of each block domain, a contour pixel point is found starting from a first side of each contour map, and coordinates of this point will be marked to form a mark point. If no pixel points can be found from the next column, it is considered that this block domain is ended.

2. Due to the adoption of the OTSU that is a common threshold segmentation algorithm, abrupt edges may occur on the contour map, and an index number of coordinates on that position is very great or small.

At the moment, such a problem needs to be handled in combination with the contour pixel points found in the previous column. A specific example is described as follows.

The current coordinates of the contour pixel points found in the current column except the first column of pixels of each block domain are located in eight neighborhoods of previous coordinates of the contour pixel point found in a previous column (particularly are located on the upper right part, right part and lower right part of the pixel point found in the previous column). If the coordinates are not located in the eight neighborhoods of the previous coordinates, coordinates need to be supplemented, and the current coordinates are located in the eight neighborhoods of the previous coordinates after supplementation.

The coordinates are supplemented in the following two situations, and examples of the two situations are shown as follows.

Referring to FIG. 7, in a first situation, the position index of the coordinates found in the current column is smaller than the position index of the coordinates found in the previous column, that is, the position index of the current coordinates is smaller than the position index of the previous coordinates.

The position index of the current coordinates is located in a fourth column and in a third row from top to bottom of the image, and the current coordinates (X04; Y03) are recorded on the blank drawing board 3 to form a fifth mark point d5. The coordinates found in the previous column are located in the tenth row, and the previous coordinates (X03; Y10) are recorded on the blank drawing board 3 to form a fourth mark point d4. Herein, it is regarded that an abrupt edge occurs on the contour map. Therefore, in the present example, coordinates are supplemented one by one at the downside of the fifth mark point d5 to form mark points until the supplemented coordinates are located in eight neighborhoods of the fourth mark point d4 formed by the previous coordinates (X03; Y10), that is, coordinates (X04; Y04), coordinates (X04; Y05), coordinates (X04; Y06) up to coordinates (X04; Y09) are supplemented, wherein the supplemented coordinates (X04; Y09) are located in eight neighborhoods of the previous coordinates (X03; Y10), so that the envelope located in the same block domain is continuous.

Figure 8:
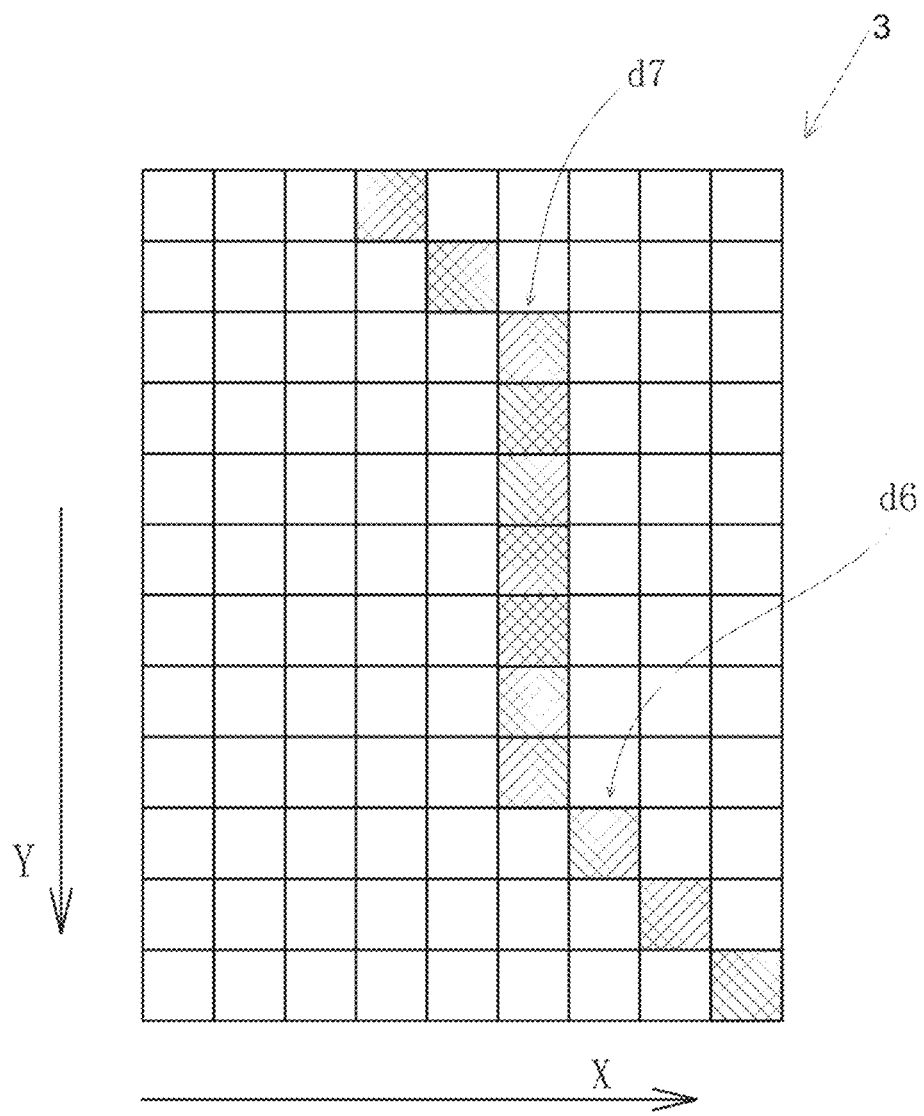
FIG. 8 is a schematic diagram of mark points formed on a blank drawing board and shows a second situation that coordinates are supplemented.
Figure 9:
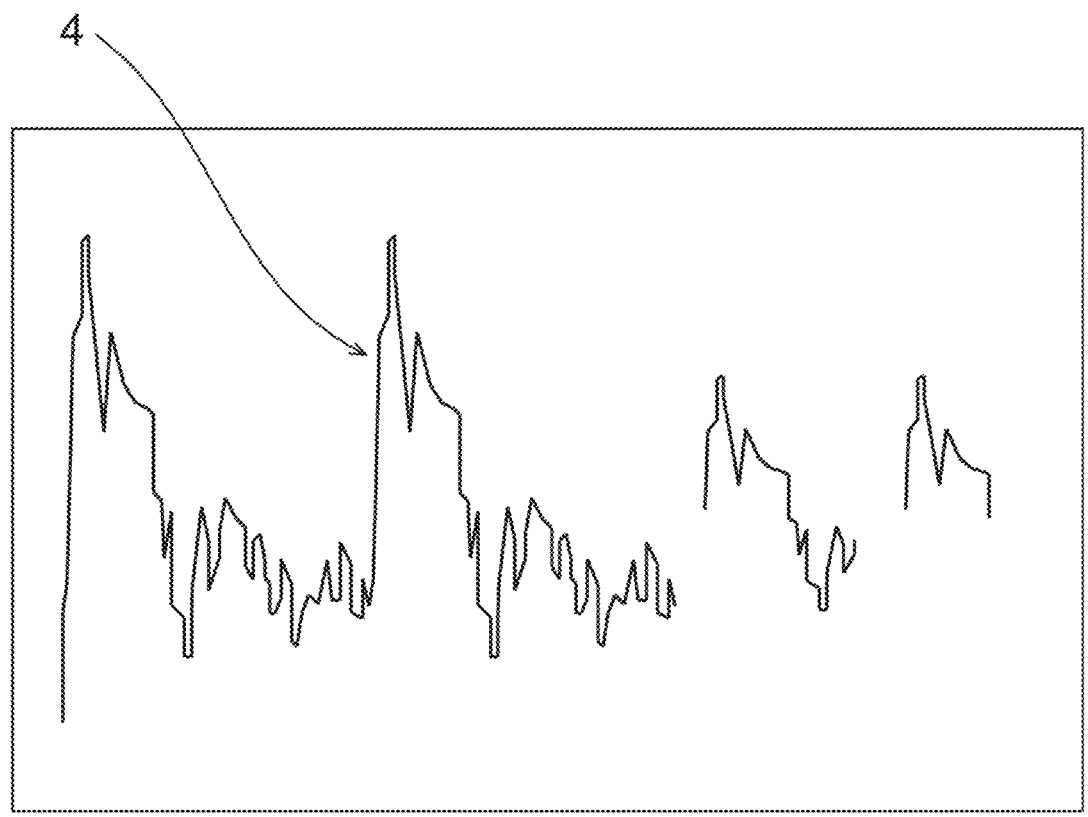
FIG. 9 is a schematic diagram of a blood flow spectrum envelope.

Referring to FIG. 8, in a second situation, the position indexes of the coordinates found in the current column are greater than the position indexes of the coordinates found in the previous column, that is, the position indexes of the current coordinates are greater than the position indexes of the previous coordinates.

The position indexes of the current coordinates are located in a seventh column and in a tenth row from top to bottom of the image, and the current coordinates (X07; Y10) are recorded on the blank drawing board 3 to form a sixth mark point d6. The coordinates found in the previous column are located in the third row, and the previous coordinates (X06; Y03) are recorded on the blank drawing board 3 to form a seventh mark point d7. Herein, it is considered that an abrupt edge occurs on the contour map. Therefore, in the present example, coordinates are supplemented one by one at the downside of the seventh mark point d7 to form mark points until the supplemented coordinates are located in eight neighborhoods of the sixth mark point d6 formed by the previous coordinates (X07; Y10), that is, coordinates (X06; Y04), coordinates (X06; Y05), coordinates (X04; Y06) up to coordinates (X04; Y09) are supplemented, wherein the supplemented coordinates (X04; Y09) are located in eight neighborhoods of the previous coordinates (X07; Y10), so that the envelope located in the same block domain is continuous.

The coordinates and the mark points described in the above-mentioned examples may be the same object, and then, it can be considered that the coordinates are marked on the blank drawing board, and the coordinates are recorded and displayed on the blank drawing board. The coordinates and the mark points described herein may be not the same object, and then, it can be considered that the coordinates are marked on a blank drawing to form the mark points, and therefore, the mark points are converted from the coordinates. However, in any case, the blank drawing board records the positions of the contour pixels on the blank drawing board.

The above-mentioned method is written into a readable storage medium after code programming, and this readable storage medium can be installed in any computer, tablet computer and smartphone to implement this method.

Or, the above-mentioned method is installed in any tablet computer and smartphone by downloading an APP after code programming, and thus, this method can be implemented in a phone.

The above description is an illustrative description for the present disclosure and does not represent the protection scope of the present disclosure.

In the above-mentioned examples, each example has its own emphasis. The content not completely described in a certain example can be combined with contents shown in other examples. The above-mentioned examples are not single examples, and can form new examples under possible combinations, but the formed new examples must not depart from the core concept of the present disclosure. Furthermore, if the combination of some examples conflicts with the inventive content of this patent to form contradictions, simple combination of the examples is not allowable, and should be avoided, or the combination should be followed by conflict elimination or contradictory adjustment.

It should be noted that the examples are not limited to the only implementation method in the present disclosure, but exemplify one or more of methods that can be implemented in the present disclosure.

Other technical solutions obtained without departing from the core concept of the present disclosure fall within the protection scope of the present disclosure.

What is claimed is:

1. A generation method for a blood flow spectrum envelope, being implemented by a computer device with a processor according to the following steps:
   S1: importing an image;
      the image being a blood flow spectrum image acquired from a blood vessel of an organism by an ultrasound device, a starting position of a blood flow spectrum waveform in the image serving as a first lateral edge, a second lateral edge being opposite to the first lateral edge, and a spacing between the first lateral edge and the second lateral edge serving as a width of the image; a direction directed by a peak of the blood flow spectrum waveform serving as an upside of the image, a direction opposite to the upside serving as a downside, and a spacing between the upside and the downside serving as a height of the image;
   S2: finding block domains;
   (i) the block domain being a maximum connected domain between the first lateral edge and the second lateral edge; and (ii) further comprising other domains located between the maximum connected domain and each of the first lateral edge and the second lateral edge being further comprised when a width of the maximum connected domain does not fully occupy a width of the image, and gray values of the other domains and the maximum connected domain being within the same interval;
   S3: drawing a contour of each block domain by using contour pixel points to obtain a contour map; and
   S4: finding the contour pixel points from a first side of the contour map, recording coordinates of the found contour pixel points, and connecting all the coordinates to form a blood flow spectrum envelope, wherein
   (i) the coordinates of the contour pixel points found among all the block domains are not connected to each other;
   (ii) the found contour pixel points are first contour pixel points found from top to bottom in respective columns;
   (iii) coordinates of a contour pixel point found in a current column except a first column of each block domain need to be located in eight neighborhoods of coordinates of a contour pixel point found in a previous column; otherwise, coordinates are supplemented until the coordinates of the contour pixel point found in the current column are located in the eight neighborhoods of the coordinates of the contour pixel points found in the previous column.

2. The generation method for the blood flow spectrum envelope of claim 1, wherein after the image is imported, the method also comprises a step of performing threshold processing on the image, which specifically comprises:
   S11: performing Gaussian smoothing on the image; and
   S12: acquiring a binary image by using an OTSU threshold segmentation algorithm.

3. The generation method for the blood flow spectrum envelope of claim 2, wherein the step of finding the block domains comprises the following steps:
   S21: acquiring all block domains in the binary image;
   S22: finding a maximum connected domain between a first lateral edge and a second lateral edge by adopting a non-maximum suppression algorithm; and
   S23: when a width of the maximum connected domain does not fully occupy the width of the image, finding other domains between the maximum connected domain and each of the first lateral edge and the second lateral edge by adopting the non-maximum suppression algorithm again.

4. The generation method for the blood flow spectrum envelope of claim 3, wherein the number of the other domains between the maximum connected domain and each of the first lateral edge and the second lateral edge is not limited;
   a width of any other domain is not smaller than 1/20 of the width of the image, and a height of any other domain is not smaller than 1/4 of the height of the image, otherwise, a domain is not recognized as other domains; and
   when the other domains still do not fully occupy a width between the maximum connected domain and each of the first lateral edge and the second lateral edge, another domain is further found on a part not occupied on a width among the maximum connected domain, the other domains, the first lateral edge and the second lateral edge by using the non-maximum suppression algorithm until no other domains exist in the part not occupied on the width.

5. The generation method for the blood flow spectrum envelope of claim 1, wherein the step of drawing the contour of each block domain to obtain the contour map comprises specific steps of:
   S31: cropping the image by taking the block domains as mask files to obtain a cropped block domain image; and
   S32: for the block domain image, drawing a contour of each block domain by using a Sobel operator to obtain a contour map, wherein the contour map is formed by contour pixel points.

6. The generation method for the blood flow spectrum envelope of claim 5, wherein the step of finding the contour pixel points starting from the first side of the contour map, and recording the coordinates of the found contour pixel points comprises specific steps of:
   S41: newly creating a blank drawing board of which all pixel points have gray values being be 0;

S42: marking the coordinates on the blank drawing board to form mark points on the blank drawing board; and S43: connecting all the mark points to form the blood flow spectrum envelope.

7. The generation method for the blood flow spectrum envelope of claim 6, wherein the coordinates are supplemented, which specifically comprises:

comparing position indexes of the current coordinates with position indexes of the previous coordinates with the coordinates of the contour pixel point found in the current column as current coordinates and the coordinates of the contour pixel point found in the previous column as previous coordinates, wherein the position indexes are index numbers of coordinates in pixel rows on the blank drawing board, and the index numbers are gradually increased from upside to downside;

supplementing coordinates one by one at the downside of the current coordinates until the supplemented coordinates are located in eight neighborhoods of the previous coordinates when the position indexes of the current coordinates are smaller than the position indexes of the previous coordinates; and supplementing coordinates one by one at the downside of the previous coordinates until the supplemented coordinates are located in eight neighborhoods of the current coordinates when the position indexes of the current coordinates are greater than the position indexes of the previous coordinates.

8. The generation method for the blood flow spectrum envelope of claim 1, wherein the image comprises one of:

a PGM image, a DICOM image and an NIFTI image;

any one of a JPEG image, a BMP image, a PNG image and a TIFF image obtained after any one of the PGM image, the DICOM image and the NIFTI image is converted; and a static image with any frame in a video file format.

9. A generation device for a blood flow spectrum envelope, comprising a processor, a communication interface and a memory, wherein the memory stores a computer program, and the computer program, when executed by the processor, enables the processor to perform the steps of the generation method for the blood flow spectrum envelope of claim 1.

10. An ultrasound device, comprising a display, a processor, a communication interface, a memory and an ultrasound transducer probe, the processor being in data connection with the ultrasound transducer probe by the communication interface, and issuing an instruction to the ultrasound transducer probe, and the ultrasound transducer probe feeding an ultrasound signal back to the processor; and the processor displaying the ultrasound signal on the display to form a blood flow spectrum image, wherein the processor performs the steps of the generation method for the blood flow spectrum envelope of claim 1.

\* \* \* \* \*